Figure 1:
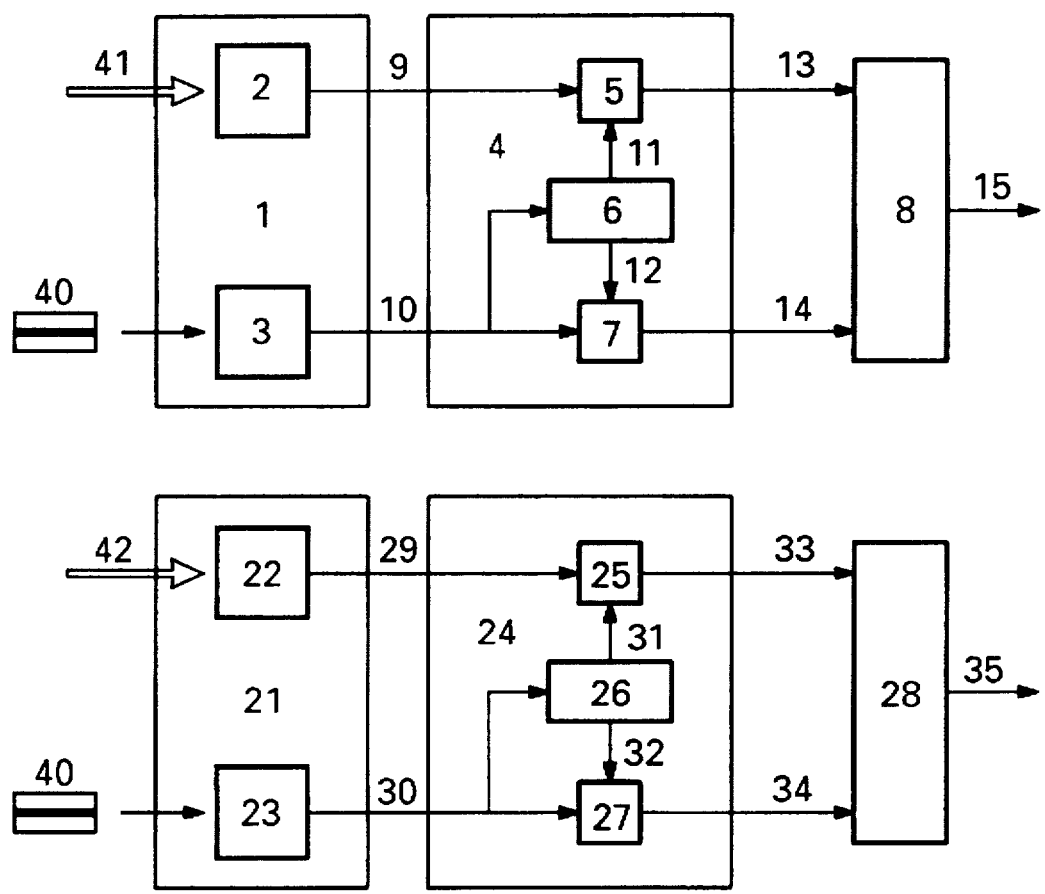

United States Patent [19]

Hekstra

[11] Patent Number: 5,753,898
[45] Date of Patent: May 19, 1998

[54] METHOD FOR BEING CAPABLE OF CARRYING OUT, WITH THE SAME DATA CARRIER, VARIOUS AUTHENTICATION PROCESSES, AS WELL AS SYSTEM

[75] Inventor: Andries Pieter Hekstra, Voorschoten, Netherlands

[73] Assignee: Koninklijke PTT Nederland N.V., Netherlands

[21] Appl. No.: 694,549

[22] Filed: Aug. 9, 1996

[30] Foreign Application Priority Data

Aug. 16, 1995 [NL] Netherlands ............ 1000988

[51] Int. Cl.$^6$ .............. G06K 5/00; G06F 7/04; H04K 4/00
[52] U.S. Cl. .............. 235/380; 235/382; 348/825.34; 380/25
[58] Field of Search ............ 380/23, 24, 25, 380/27, 28, 30; 235/381, 382, 380, 375; 902/2–7, 24–25, 28, 40; 340/225.31, 225.33, 225.34

[56] References Cited

U.S. PATENT DOCUMENTS

| | | | |
|---|---|---|---|
| 4,186,871 | 2/1980 | Anderson et al. | 235/380 |
| 4,214,230 | 7/1980 | Fak | 235/380 |
| 4,281,215 | 7/1981 | Atalla | 380/23 |
| 4,453,074 | 6/1984 | Weinstein | 235/380 |
| 4,608,486 | 8/1986 | Berstein et al. | 235/379 |

(List continued on next page.)

FOREIGN PATENT DOCUMENTS

| | | |
|---|---|---|
| 0 385 290 | 2/1990 | European Pat. Off. . |
| 33 22 524 | 1/1985 | Germany . |
| 33 42 651 | 5/1985 | Germany . |
| 37 36 190 | 5/1988 | Germany . |

OTHER PUBLICATIONS

Chapter Two, "Block Ciphers and Stream Ciphers" (pp. 13–113), Chapter Four, Communication Security and File Security using Cryptography (pp. 192–270), Chapter Ten, Applying Cryptography to Pin–Based Electronic Funds Transfer Systems (pp. 429–473), Chapter Eleven, Applying Cryptography to Electronic Funds Transfer Systems—Personal Indentification Numbers and Personal Keys (pp. 474–606), all taken from *Contemporary Cryptology—The Science of Information Integrity*, edited by Gustavis J. Simmons, (copyright 1992, IEEE Press).

Chapter 2, "Stream Ciphers" (pp. 65–1340, Chapter 4, Public Key Cryptography (pp. 177–288), Chapter 12, The Smart Card: A Standardized Security Device Dedicated to Public Cryptology (pp. 559, 561–6130, all taken from C. Meyer et al, *Cryptography A New Dimension in Computer Data Security—A guide for the Design and Implementation of Secure Systems* (copyright 1982, John Wiley & Sons, 1982).

*Primary Examiner*—Donald T. Hajec
*Assistant Examiner*—Thien Minh Le
*Attorney, Agent, or Firm*—Michaelson & Wallace; Peter L. Michaelson

[57] ABSTRACT

Known methods for being capable of carrying out, with the same data carrier, various authentication processes are based on non-standardized data carriers (smart cards) on which there are stored two different access codes. Per first authentication process, a first user generates a first user code which is compared to a version, transformed by way of a transformation, of a first access code stored on the data carrier. Per second authentication process, a second user generates a second user code which is compared to a version, transformed by way of the transformation, of a second access code stored on the data carrier. By now having the transformation in this case take place, per other authentication process, by way of another transformation, there may be used, for different authentication processes, the same worldwide standardized data carrier on which there is stored only one access code. The first/second user then once again generates the first/second user code, which is compared to a version transformed by way of a first/second transformation of the only access code stored on the data carrier.

10 Claims, 1 Drawing Sheet

U.S. PATENT DOCUMENTS

| | | | |
|---|---|---|---|
| 4,700,055 | 10/1987 | Kashkashian, Jr. . | |
| 4,707,592 | 11/1987 | Ware | 235/380 |
| 4,837,422 | 6/1989 | Dethloff et al. . | |
| 4,906,828 | 3/1990 | Halpern | 235/380 |
| 5,017,766 | 5/1991 | Tamada et al. | 235/492 |
| 5,120,939 | 6/1992 | Claus et al. | 235/382 |
| 5,276,311 | 1/1994 | Hennige . | |
| 5,285,055 | 2/1994 | Oonakahara et al. . | |
| 5,336,870 | 8/1994 | Hughes et al. | 235/379 |
| 5,390,331 | 2/1995 | Yui . | |
| 5,635,012 | 6/1997 | Belluci et al. | 235/380 |

METHOD FOR BEING CAPABLE OF CARRYING OUT, WITH THE SAME DATA CARRIER, VARIOUS AUTHENTICATION PROCESSES, AS WELL AS SYSTEM

Method for being capable of carrying out, with the same data carrier, various authentication processes, as well as system.

BACKGROUND OF THE INVENTION

The invention relates to a method for being capable of carrying out, with the same data carrier, various authentication processes, on which data carrier there is stored at least one code, which method in the event of a first authentication process comprises the steps of receiving a first code stored on the data carrier and a second code originating from a user, carrying out at least one of the following transformations
a first transformation of the first code into a transformed first code, and
a second transformation of the second code into a transformed second code, comparing codes for in response thereto rounding off the first authentication process, and which method in the event of a second authentication process comprises the steps of receiving a third code stored on the data carrier and a fourth code originating from a user, carrying out at least one of the following transformations
a third transformation of the third code into a transformed third code, and
a fourth transformation of the fourth code into a transformed fourth code, comparing codes for in response thereto rounding off the second authentication process.

Such a method is disclosed in U.S. Pat. No. 4,837,422. Herein, there is shown a data carrier constructed as smart card (FIG. 2 of U.S. Pat. No. 4,837,422) on which there is stored a first code (a PIN code stored in memory 210 in FIG. 2 of U.S. Pat. No. 4,837,422) and on which there is stored a third code (a SUBPIN code stored in memory 207 in FIG. 2 of U.S. Pat. No. 4,837,422). Generally, said PIN code and SUBPIN code are stored in encrypted manner.

In the event of a first authentication process relating to, e.g., a first system and, e.g., a first user, the same generates the real PIN code (the second code), which is received by the first system, whereafter the PIN code stored in encrypted manner (the first code) is read out and (by way of the first transformation) is decrypted, which provides the PIN code (the transformed first code). The same is then compared to the generated real PIN code (the second code), and in response thereto the first authentication process is rounded off positively (in the event of equality) or negatively (in the event of unequality). Instead of or in addition to, as the case may be, the decryption of the encrypted PIN code (transforming, by way of the first transformation, the first code into the transformed first code), one of the options also is to transform the real PIN code generated by the first user (the second code) by way of the second transformation into the transformed second code, whereafter on the one hand said transformed second code is compared to on the other hand the first code or the transformed first code, as the case may be, etc.

In the event of a second authentication process relating to, e.g., a second system and, e.g., a second user, the same generates the real SUBPIN code (the fourth code), which is received by the second system, whereafter the SUBPIN code stored in encrypted manner (the third code) is read out and (by way of the third transformation) is decrypted, which provides the SUBPIN code (the transformed third code). The same is then compared to the generated real SUBPIN code (the fourth code), and in response thereto the second authentication process is rounded off positively (in the event of equality) or negatively (in the event of unequality). Instead of or in addition to, as the case may be, the decryption of the encrypted SUBPIN code (transforming, by way of the third transformation, the third code into the transformed third code), one of the options also is to transform the real SUBPIN code generated by the second user (the fourth code) by way of the fourth transformation into the transformed fourth code, whereafter on the one hand said transformed fourth code is compared to on the other hand the third code or the transformed third code, as the case may be, etc.

Both authentication processes might further relate to various systems having one user, or might relate (as in U.S. Pat. No. 4,837,422) to one system having various users.

Such a method has the drawback, inter alia, that for the benefit of the first authentication process, the first code should be on the data carrier and that for the benefit of the second authentication process, the third code should be on the same data carrier. As a result, it becomes impossible to make use of data carriers already frequently in circulation, which do not dispose of the option of storing a next code for each next authentication process.

SUMMARY OF THE INVENTION

One of the objects of the invention is to provide a method of the kind referred to in the preamble, it becoming possible to make use of data carriers already frequently in circulation, which do not dispose of the option of storing a next code for each next authentication process.

For this purpose, the method according to the invention is characterised in that the first code and the third code are equal, whereas the second code and the fourth code are different, and with at least one of the respective first and second transformations differing from the respective third and fourth transformations.

Since at least one of the respective first and second transformations differs from the respective third and fourth transformations, the first code and the third code may be equal and coincide completely while the second code and the fourth code are still different. Here, the option arises of using data carriers where only the first code (which is equal to, and coincides with, the third code) has been stored, while said data carriers still can be used for the benefit of, e.g., two different authentication processes, which then require generation of the second code and the fourth code, respectively.

The invention is founded, inter alia, on the insight that the first authentication process is based on at least three parameters, namely the first code, the second code and at least one (first or second) transformation, and the second authentication process is based on at least three parameters, namely the third code, the fourth code and at least one (third or fourth) transformation, and that, when of at least three parameters one parameter receives a fixed value, the other at least two parameters may still be chosen freely.

Thus, the problem of the inability to make use of data carriers already frequently in circulation, which do not dispose of the option to store a next code for each next authentication process, is solved by in at least one system adjusting at least one transformation.

A first embodiment of the method according to the invention is characterised in that the first transformation differs from the third transformation, with the second transformation being equal to the fourth transformation.

Here, in the event of the first authentication process relating to the first system and the first user, there is generated, by said first user, the second code, which is received by the first system, whereafter the first code stored in encrypted manner or the third code stored in encrypted manner is read out and decrypted by way of the first transformation, which provides the first code transformed in a first manner or the third code transformed in a first manner, which is then compared to the second code generated (and possibly transformed in a second manner), and in response thereto the first authentication process is rounded off positively (in the event of equality) or negatively (in the event of unequality). In the event of the second authentication process relating to the second system and the second user, there is generated, by said second user, the fourth code, which is received by the second system, whereafter the first code stored in encrypted manner or the third code stored in encrypted manner is read out and is decrypted by way of the third transformation, which provides the first code transformed in a third manner or the third code transformed in a third manner, which is then compared to the fourth code generated (and possibly transformed in a fourth manner), and in response thereto the second authentication process is rounded off positively (in the event of equality) or negatively (in the event of unequality). Since the first transformation and the third transformation differ, there therefore has to be generated, for each system, another code (the second or the fourth) by the user, while there is located on the data carrier still only one code (the first or the third). The second transformation and the fourth transformation are mutually equal, and might in the most simple case be left out, which will not promote safety in general, however.

A second embodiment of the method according to the invention is characterised in that the second transformation differs from the fourth transformation, with the first transformation being equal to the third transformation.

Here, in the event of the first authentication process relating to the first system and the first user, there is generated, by said first user, the second code, which is received by the first system and is transformed into the second code transformed in a second manner, whereafter the first code (possibly stored in encrypted manner) or the third code (possibly stored in encrypted manner) is read out and is possibly decrypted by way of the first transformation, which provides the first code (possibly transformed in a first manner) or the third code (possibly transformed in a first manner), which is then compared to the second code generated and transformed in a second manner, and in response thereto the first authentication process is rounded off positively (in the event of equality) or negatively (in the event of unequality). In the event of the second authentication process relating to the second system and the second user, there is generated, by said second user, the fourth code, which is received by the second system and is transformed into the fourth code transformed in a fourth manner, whereafter the first code (possibly stored in encrypted manner) or the third code (possibly stored in encrypted manner) is read out and is possibly decrypted by way of the third transformation, which provides the first code (possibly transformed in a third manner) or the third code (possibly transformed in a third manner), which is then compared to the fourth code generated and transformed in a fourth manner, and in response thereto the second authentication process is rounded off positively (in the event of equality) or negatively (in the event of unequality). Since the second transformation and the fourth transformation differ, there therefore has to be generated, for each system, another code (the second or the fourth) by the user, while there is located on the data carrier still only one code (the first or the third). The first transformation and the third transformation are mutually equal, and might in the most simple case be left out, which will not promote safety in general, however.

A third embodiment of the method according to the invention is characterised in that the first transformation differs from the third transformation, and the second transformation differs from the fourth transformation.

Here, in the event of the first authentication process relating to the first system and the first user, there is generated, by said first user, the second code, which is received by the first system and is transformed into the second code transformed in a second manner, whereafter the first code stored in encrypted manner or the third code stored in encrypted manner is read out and is decrypted by way of the first transformation, which provides the first code transformed in a first manner or the third code transformed in a first manner, which is then compared to the second code generated and transformed in a second manner, and in response thereto the first authentication process is rounded off positively (in the event of equality) or negatively (in the event of unequality). In the event of the second authentication process relating to the second system and the second user, there is generated, by said second user, the fourth code, which is received by the second system and is transformed into the fourth code transformed in a fourth manner, whereafter the first code stored in encrypted manner or the third code stored in encrypted manner is read out and is decrypted by way of the third transformation, which provides the first code transformed in a third manner or the third code transformed in a third manner, which is then compared to the fourth code generated and transformed in a fourth manner, and in response thereto the second authentication process is rounded off positively (in the event of equality) or negatively (in the event of unequality). Since not only the first transformation and the third transformation differ, but also the second transformation and the fourth transformation differ, there therefore has to be generated, for each system, another code (the second or the fourth) by the user, while there is located on the data carrier still only one code (the first or the third), it being possible to speak of a well-protected system.

A fourth embodiment of the method according to the invention is characterised in that at least one of the transformations depends on a fifth code stored on the data carrier.

Since at least one of the transformations depends on a fifth code stored on the data carrier, such as, e.g., a number of a (giro or bank) account or a birth date, it becomes considerably more difficult to fathom the method according to the invention, which benefits safety.

The invention further relates to a system for being capable of carrying out, with the same data carrier, various authentication processes, on which data carrier there is stored at least one code, which system in the event of a first authentication process is provided with first receiving means for receiving a first code stored on the data carrier and a second code originating from a user, first transforming means for carrying out at least one of the following transformations
a first transformation of the first code into a transformed first code, and a second transformation of the second code into a transformed second code, first comparing means for comparing codes for in response thereto rounding off the first authentication process, and which system in the event of a second authentication process is provided with second receiving means for receiving a third code stored on the data carrier and a fourth code originating from a user, second transforming means for carrying out at least one of the following transformations a third transformation of the third code into a transformed third code, and a fourth transformation of the fourth code into a transformed fourth code, second comparing means for comparing codes for in response thereto rounding off the second authentication process.

The system according to the invention is characterised in that the first code and the third code are equal, whereas the second code and the fourth code are different, and with at least one of the respective first and second transformations differing from the respective third and fourth transformations.

A first embodiment of the system according to the invention is characterised in that the first transformation differs from the third transformation, with the second transformation being equal to the fourth transformation.

A second embodiment of the system according to the invention is characterised in that the second transformation differs from the fourth transformation, with the first transformation being equal to the third transformation.

A third embodiment of the system according to the invention is characterised in that the first transformation differs from the third transformation, and the second transformation differs from the fourth transformation.

A fourth embodiment of the system according to the invention is characterised in that at least one of the transformations depends on a fifth code stored on the data carrier.

REFERENCES

U.S. Pat. No. 4,837,422

"Contemporary Cryptology", The Science of Information Integrity, edited by Gustavus J. Simmons, IEEE Press, 1992

"Cryptography: a new dimension in computer data security", A guide for the Design and Implementation of Secure Systems, by Carl H. Meyer and Stephen M. Matyas, A Wiley-Interscience Publication, John Wiley & Sons, 1982

NL 1000988 Dutch patent application

All references are considered incorporated in the present patent application.

EXEMPLARY EMBODIMENT

The invention will be explained in greater detail by reference to an exemplary embodiment shown in the FIGURE. Here:

FIG. 1 shows a system according to the invention for the application of a method according to the invention.

The system shown in FIG. 1 according to the invention comprises first receiving means 1 which are provided, e.g., with a keyboard device 2 and a card reader 3, and comprises first transforming means 4 coupled to the first receiving means 1 which are provided with, e.g., an enciphering device 5, processor means 6 and an enciphering device 7. A first input of enciphering device 5 is coupled, by way of a connection 9, to an output of keyboard device 2, and a first input of enciphering device 7 and an input of processor means 6 are coupled, by way of a connection 10, to an output of card reader 3. A first output of processor means 6 is coupled, by way of a connection 11, to a second input of enciphering device 5, and a second output of processor means 6 is coupled, by way of a connection 12, to a second input of enciphering device 7. An output of enciphering device 5 is coupled, by way of a connection 13, to a first input of a first comparing device 8, and an output of enciphering device 7 is coupled, by way of a connection 14, to a second input of first comparing device 8, which is further provided with an output 15.

The system shown in FIG. 1 according to the invention further comprises second receiving means 21 which are provided, e.g., with a keyboard device 22 and a card reader 23, and the system comprises second transforming means 24 coupled to the second receiving means 21 which are provided, e.g., with an enciphering device 25, processor means 26 and an enciphering device 27. A first input of enciphering device 25 is coupled, by way of a connection 29, to an output of keyboard device 22, and a first input of enciphering device 27 and an input of processor means 26 are coupled, by way of a connection 30, to an output of card reader 23. A first output of processor means 26 is coupled, by way of a connection 31, to a second input of enciphering device 25, and a second output of processor means 26 is coupled, by way of a connection 32, to a second input of enciphering device 27. An output of enciphering device 25 is coupled, by way of a connection 33, to a first input of a second comparing device 28, and an output of enciphering device 27 is coupled, by way of connection 34, to a second input of second comparing device 28, which is further provided with an output 35.

The operation of the system shown in FIG. 1 is as follows. A first user, who at a given moment has in his possession a data carrier such as, e.g., a magnetic card, on which there is stored a first code 40, places said magnetic card in card reader 3, which reads out the first code 40 and further data (such as account number and name and address), whereafter the first code 40 is fed, by way of connection 10, to enciphering device 7 and the further data is fed, by way of connection 10, to processor means 6. Furthermore, said first user by way of keyboard 2 generates a second code which is fed, by way of connection 9, to enciphering device 5. In response to the further data, processor means 6 generate a first key which is fed, by way of connection 12, to enciphering device 7 which, in response to said first key, transforms the first code into a transformed first code and transmits the same, by way of connection 14, to first comparing device 8. In response to the further data, processor means 6 further generate a second key which is fed, by way of connection 11, to enciphering device 5 which, in response to said second key, transforms the second code into a transformed second code, and transmits the same, by way of connection 13, to first comparing device 8 which compares both transformed codes with one another and, in the event of equality, generates a positive authentication signal by way of output 15 and, in the event of unequality, generates a negative authentication signal by way of output 15. In response to the positive authentication signal, the first user gains access, e.g., to an automatic cash dispenser.

A second user who at a given moment has in his possession the same data carrier such as, e.g., the magnetic card, on which there is stored the first code 40, places said magnetic card in card reader 23, which reads out the first code 40 and further data (such as account number and name and address), whereafter the first code 40 is fed, by way of connection 30, to enciphering device 27 and the further data is fed, by way of connection 30, to processor means 26. Furthermore, said second user generates, by way of keyboard 22, a fourth code which is fed, by way of connection 29, to enciphering device 25. In response to the further data, processor means 26 generate a third key which is fed, by way of connection 32, to enciphering device 27 which, in response to said third key, transforms the first code into a transformed first code and transmits the same, by way of connection 34, to second comparing device 28. In response to the further data, processor means 26 further generate a fourth key which is fed, by way of connection 31, to enciphering device 25 which, in response to said fourth key, transforms the fourth code into a transformed fourth code and transmits the same, by way of connection 33, to second comparing device 28 which compares both transformed codes with one another and, in the event of equality, generates a positive authentication signal by way of output 35 and, in the event of unequality, generates a negative authentication signal by way of output 35. In response to the positive authentication signal, the second user gains access, e.g., to an automatic parcel device, with the postal expenses of a parcel to be mailed being determined and charged in an automatic manner.

Since the second user is not familiar with the second code, he will not succeed in gaining access to the automatic cash dispenser. In general the first user, if he is, e.g., the owner of the data carrier, or is the boss of a company which possesses the data carrier and which employs the second user, will be familiar with both the second and the fourth code, though such is not required. Thus, by way of the same data carrier on which there are stored the first code and some further data, various authentication processes may be carried out, with at least one of the users, due to unfamiliarity with at least one of the codes, not being capable of rounding off at least one of the authentication processes with positive result.

The first code stored on the data carrier therefore is a (possibly encrypted) PIN code (Personal Identification Number), and since either at least the first code by way of the first key and the first code by way of the third key are transformed in a different manner, or at least the second code by way of the second key and the fourth code by way of the fourth key are transformed in a different manner, it is achieved that it is no longer required to store various PIN codes (such as a PIN code and a SUBPIN code, or a first code and a third code) on the same data carrier. As a result, use may be made of worldwide distributed standard data carriers (such as, e.g., magnetic cards or chip cards), which of course is of great advantage.

If both the first code by way of the first key and the first code by way of the third key are transformed in a different manner, and additionally the second code by way of the second key and the fourth code by way of the fourth key are transformed in a different manner, safety will generally be best. By rendering at least one of said transformations dependent upon a fifth code stored on the data carrier (such as at least a portion of the further data), said safety is still further enhanced. In this case processor means 6, in response to a first portion of the further data (e.g., the account number), might generate a first value and a second value from a table, whereafter the first value, in response to a second portion of the further data (e.g., the name), is used to calculate the first key, and the second value, in response to a third portion of the further data (e.g., the address), is used to calculate the second key. Furthermore processor means 26, in response to a first portion of the further data (e.g., the account number), might generate a third value and a fourth value from a table, whereafter the third value, in response to a second portion of the further data (e.g., the name), is used to calculate the third key, and the fourth value, in response to a third portion of the further data (e.g., the address), is used to calculate the fourth key. Also, at least one of the transformations may be rendered dependent upon, e.g., the fifth code by combining said fifth code, in a manner known to those skilled in the art, with the code arriving by way of at least one of the connections 9, 10, 29 and 30.

Processor means 6 (26) comprise, e.g., a detector for detecting the further data, a table memory having at least three columns, with a first column serving to store, e.g., account numbers, and a second column serving to store a first (third) key or a first (third) value, and a third column serving to store a second (fourth) key or a second (fourth) value, and comprise a processor for controlling the detector and the table memory, and for possibly calculating the first and second (third and fourth) keys, respectively, on the basis of the first and second (third and fourth) values, respectively and, e.g., names and addresses. Enciphering devices 5 and 6 (25 and 26) are, e.g., encryption circuits known to those skilled in the art which, e.g., convert an x-bit input word as a function of a y-bit key word into a z-bit output word, with the relationship $x=y=z$ generally applying, though not absolutely necessary. Comparing device 8 (28) is, e.g., a comparator known to those skilled in the art.

First transforming means 4 therefore carry out, by way of enciphering device 7, a first transformation of the first code into a transformed first code by way of the first key, and therefore carry out, by way of enciphering device 5, a second transformation of the second code into a transformed second code by way of the second key. Second transforming means 24 therefore carry out, by way of enciphering device 27, a third transformation of the first (=third) code into a transformed first (=transformed third) code by way of the third key, and therefore carry out, by way of enciphering device 25, a fourth transformation of the fourth code into a transformed fourth code by way of the fourth key. Of course, many other transformations known to those skilled in the art may be applied, such as, e.g., transformations not based on keys.

I claim:

1. Method for carrying out, with the same data carrier, various authentication processes, on which data carrier there is stored at least one code, which method comprises a first authentication process including the steps of receiving a first code stored on the data carrier and a second code originating from a user, carrying out at least one of the following transformations
     a first transformation of the first code into a transformed first code, and
     a second transformation of the second code into a transformed second code, comparing said first and second codes thereto rounding off the first authentication process, and a second authentication process comprises the steps of receiving a third code stored on the data carrier and a fourth code originating from a user, carrying out at least one of the following transformations
     a third transformation of the third code into a transformed third code, and
     a fourth transformation of the fourth code into a transformed fourth code, comparing said third and fourth codes thereto rounding off the second authentication process, characterised in that the first code and the third code are equal, whereas the second code and the fourth code are different, and with at least one of the respective first and second transformations differing from the respective third and fourth transformations.

2. Method according to claim 1, characterised in that the first transformation differs from the third transformation, with the second transformation being equal to the fourth transformation.

3. Method according to claim 1, characterised in that the second transformation differs from the fourth transformation, with the first transformation being equal to the third transformation.

4. Method according to claim 1, characterised in that the first transformation differs from the third transformation, and the second transformation differs from the fourth transformation.

5. Method according to claim 1, characterised in that at least one of the transformations depends on a fifth code stored on the data carrier.

6. System for carrying out, with the same data carrier, various authentication processes, on which data carrier there is stored at least one code, which system comprises a first authentication process is provided with first receiving means for receiving a first code stored on the data carrier and a second code originating from a user, first transforming means for carrying out at least one of the following transformations a first transformation of the first code into a transformed first code, and a second transformation of the second code into a transformed second code, first comparing means for comparing said first and second codes thereto rounding off the first authentication process, and a second authentication process is provided with second receiving means for receiving a third code stored on the data carrier and a fourth code originating from a user, second transforming means for carrying out at least one of the following transformations a third transformation of the third code into a transformed third code, and a fourth transformation of the fourth code into a transformed fourth code, second comparing means for comparing said third and fourth codes thereto rounding off the second authentication process, characterised in that the first code and the third code are equal, whereas the second code and the fourth code are different, and with at least one of the respective first and second transformations differing from the respective third and fourth transformations.

7. System according to claim 6, characterised in that the first transformation differs from the third transformation, with the second transformation being equal to the fourth transformation.

8. System according to claim 6, characterised in that the second transformation differs from the fourth transformation, with the first transformation being equal to the third transformation.

9. System according to claim 6, characterised in that the first transformation differs from the third transformation, and the second transformation differs from the fourth transformation.

10. System according to claim 6, characterised in that at least one of the transformations depends on a fifth code stored on the data carrier.

* * * * *